(12) United States Patent
Caprara

(10) Patent No.: US 12,453,606 B2
(45) Date of Patent: Oct. 28, 2025

(54) OPTICAL ASSEMBLY FOR USE IN AN OBJECT HANDLING STATION

(71) Applicant: STEELCO S.P.A., Riese Pio X (IT)

(72) Inventor: Alessandro Caprara, Isola della Scala (IT)

(73) Assignee: STEELCO S.P.A., Riese Pio X (IT)

( * ) Notice: Subject to any disclaimer, the term of this patent is extended or adjusted under 35 U.S.C. 154(b) by 219 days.

(21) Appl. No.: 18/256,112

(22) PCT Filed: Dec. 6, 2021

(86) PCT No.: PCT/IT2021/050393
§ 371 (c)(1),
(2) Date: Jun. 6, 2023

(87) PCT Pub. No.: WO2022/123609
PCT Pub. Date: Jun. 16, 2022

(65) Prior Publication Data
US 2024/0074814 A1 Mar. 7, 2024

(30) Foreign Application Priority Data

Dec. 7, 2020 (IT) ........................ 102020000030098

(51) Int. Cl.
| | |
|---|---|
| *A61B 34/20* | (2016.01) |
| *A61B 90/00* | (2016.01) |
| *A61B 90/50* | (2016.01) |
| *A61B 90/96* | (2016.01) |

(Continued)

(52) U.S. Cl.
CPC ............ *A61B 34/20* (2016.02); *A61B 90/361* (2016.02); *A61B 90/96* (2016.02); *A61B 90/98* (2016.02); *G16H 40/63* (2018.01); *A61B 2034/2051* (2016.02); *A61B 2034/2057* (2016.02); *A61B 2034/2065* (2016.02); *A61B 2090/365* (2016.02); *A61B 2090/502* (2016.02)

(58) Field of Classification Search
CPC ........ G06N 3/08; G06T 19/006; G16H 40/40; G06F 3/011
See application file for complete search history.

(56) References Cited

U.S. PATENT DOCUMENTS

| | | | | |
|---|---|---|---|---|
| 2017/0027045 A1* | 1/2017 | Chemel | ................. | G05B 15/02 |
| 2017/0301173 A1* | 10/2017 | Hindsgaul | ............... | G07F 9/026 |

(Continued)

OTHER PUBLICATIONS

International Search Report and Written Opinion, issued in the corresponding PCT application No. PCT/IT2021/050393, dated Apr. 11, 2022, 16 pages.

(Continued)

*Primary Examiner* — Grace Q Li
(74) *Attorney, Agent, or Firm* — HSML P.C.

(57) ABSTRACT

The present invention relates to a wearable augmented reality optical assembly for use in a center for treating objects, in particular in a surgical instrument sterilization unit, to an optical apparatus comprising an optical assembly according to the invention, as well as a control unit, a method for the management of objects, in particular surgical instruments, a management and tracking program that implements said method, and a method for the management of a treatment cycle of an object to be sanitized.

16 Claims, 2 Drawing Sheets

(51) Int. Cl.
  *A61B 90/98* (2016.01)
  *G16H 40/63* (2018.01)

(56) References Cited

U.S. PATENT DOCUMENTS

2019/0328921 A1   10/2019  Zografos et al.
2022/0160433 A1*  5/2022   Rafii-Tari .............. G06T 7/0012

OTHER PUBLICATIONS

Babichenko et al., "SterileAR: Exploration of Augmented Reality and Computer Vision Approaches for Real-Time Feedback in Sterile Compounding Training", 2020 6th International Conference of the Immersive Learning Research Network (iLRN), Jun. 21, 2020, 8 pages.

Krauß et al., "Smartglasses in the Sterile Supply Process", Proceedings of the 10th Augmented Human International Conference 2019, Sep. 8, 2019.

* cited by examiner

OPTICAL ASSEMBLY FOR USE IN AN OBJECT HANDLING STATION

FIELD OF APPLICATION

Embodiments disclosed herein relate to a wearable augmented reality optical assembly for use in a center for treating objects, in particular a sterilization unit.

In particular, the optical assembly allows an operator to be supported in the management of surgical instruments and in the recomposition of kits formed by a plurality of surgical instruments suitable for use during a specific surgical operation.

Embodiments disclosed herein further relate to an apparatus comprising the optical assembly according to the invention and a method for objects handling.

Embodiments disclosed herein also relate to a method for managing an object treatment cycle, by means of which, in particular, the parameters of a treatment cycle, e.g., sterilization of surgical instruments, can be defined.

PRIOR ART

It is known that in facilities in which operating theatres suitable for surgery are provided, such as hospitals, clinics or outpatient clinics, several hundred thousand surgical instruments are usually assembled and sterilized each year, including scissors and pliers, drills, orthopedic cutters, scalpels, endoscopic instruments, trays, surgical instrument cases or the like.

A sterilization cycle consists of 3 main phases: reception and washing, packaging, sterilization and final check, usually conducted in adjacent but separate areas, for reasons of better control over the washing and sterilization process.

In the reception and washing phase, the instruments used come from the operating theatres, are positioned in bulk, and are subjected to different washing and disinfection phases. In the second phase, each individual instrument is identified and checked for integrity, wear and condition of cleanliness. When necessary, for example if the presence of organic residues is suspected, the level of cleaning is evaluated visually with the help of a magnifying glass. The instruments are then individually packaged or reassembled in kits.

Even today, checking and assembly are mainly done manually; however, there are some technologies that assist the operator in recognizing the instrument through the reading of an optical or radio frequency identification code or by displaying on-screen images of the instruments that make up the kit. Checklists and graphical representations of the precise positions of the instruments inside the container can then be used in the recomposition of the kit.

The packaged instruments or kits are then sterilized and, after a final check, re-inserted into the user circuit.

A drawback of prior art solutions for supporting the operator in the recomposition of the surgical kit is that they usually provide fixed workstations at which to operate. The need to separate the various instrument preparation sectors so as to maintain the conditions of cleanliness and sterility gradually obtained makes it impossible, therefore, to use the same workstations even in subsequent stages of kit checking, for example verification of the kit after the sterilization phase. If support for the operator is to be ensured at all stages of surgical instrument treatment, a multiplication of the number of fixed workstations is required.

Conversely, portable instruments, such as optical or radio frequency identification code readers, require handling by operators. In addition to not solving the problems of verifying the conditions of cleanliness and sterility as these instruments are handled manually, their use complicates the work of the operator, who must handle the surgical instruments and/or kit containers as well as the portable instruments all at the same time. The use of sterile gloves also makes the various operations even more difficult.

Known optical assemblies which, however, do not solve the above problems, in particular with regard to the traceability and recomposition of kits or specialized groups of objects, are described, for instance, in the following documents: BABICHENKO DMITRIY ET AL: "SterileAR: Exploration of Augmented Reality and Computer Vision Approaches far Real-Time Feedback in Sterile Compounding Training", 2020 6TH INTERNATIONAL CONFERENCE OF THE IMMERSIVE LEARNING RESEARCH NETWORK (ILRN), IMMERSIVE LEARNING RESEARCH NETWORK, 21 Jun. 2020 (2020-06-21), pages 62-69, XP033807343; US-A-2019/328921; and VERONIKA KRAUA ET AL: "Smartglasses in the Sterile Supply Process", PROCEEDINGS OF THE 10TH AUGMENTED HUMAN INTERNATIONAL CONFERENCE 2019, ACM, 2 PENN PLAZA, SUITE 701 NEW YORKNY1 0121-0701 USA, 8 Sep. 2019 (2019-09-08), pages 859-861, XP058440986. Hence, there is a need to perfect an optical assembly which can overcome at least one of the drawbacks of the prior art.

In particular, one aim of the present invention is to have an optical assembly that supports the operator in the recomposition of specialized groups of objects, in particular surgical kits.

In this way, it is possible to reduce the likelihood of errors during correct recomposition, which are time-consuming and a cause of economic loss during management of the instruments, and may also be harmful to patients. It is also possible to overcome the difficulty of training newly-hired experienced personnel, which is usually time-consuming and requires the constant support of more experienced and skilled operators in the training phases.

Another aim of this invention is to make the cleaning process more effective, and thus improve the safety of use and of objects, in particular of surgical instruments, by assisting the operator in the identification of any organic residues, stains, dirt or the like.

Yet a further aim is to maintain the efficiency of surgical instruments or kits, allowing better identification of instrument damage, such as blunt edges, released locking devices, and the presence of alterations such as rust or the like.

The invention also aims to provide an optical assembly that can be used in a plurality of processing steps for the recomposition of specialized groups of objects.

Moreover, the present invention aims to fine-tune a method for the management of objects, in particular surgical instruments, through the optical assembly of the invention itself.

Finally, the present invention aims to fine-tune a method for managing an object treatment cycle, by means of which, in particular, the parameters of the treatment cycle can be defined.

The Applicant has studied, tested and realized the present invention to overcome the drawbacks of the prior art, and to obtain the above as well as further aims and benefits.

DISCLOSURE OF THE INVENTION

The present invention is expressed and characterized in the independent claims. The dependent claims show other features of the present invention or variants of the main solution proposed.

In accordance with the foregoing aims, embodiments disclosed herein relate to a wearable augmented reality optical assembly for use in a center for treating objects, in particular a surgical instrument sterilization unit, that exceeds the limits of the prior art and eliminates defects to be found therein.

Being wearable, the optical assembly can be used without having to be handled manually, leaving the operator's hands free and safeguarding the cleanliness and sterility of objects and specialized groups of objects. It can also be taken by operators into the various areas where they must move in order to carry out their duties.

According to embodiments, the optical assembly is adapted to allow recognition, by means of computer vision techniques, of objects, in particular surgical instruments.

In accordance with embodiments, the optical assembly comprises electromagnetic acquisition means, a processor, and a viewing device.

According to embodiments, the electromagnetic acquisition means are configured to detect at least images and/or identification codes of the objects.

The processor also includes a program for managing and tracking objects adapted to recognize said objects and to provide the operator with indications for the recomposition of kits or specialized groups of objects.

The images acquired can be retained advantageously to allow better traceability of the sterilization process.

The aforementioned processor may be configured to execute image and data processing algorithms relating to the objects and to generate visual content from the images and data. The viewing device may be adapted to reproduce the visual content so as to make them visually available to an operator of the sterilization unit wearing the optical assembly.

The optical assembly allows the operator to be supported advantageously in the recomposition of the specialized group of objects, by displaying the visual content relating to the object, and possibly to the group in which the object must be inserted, so that they are directly overlaid on the external reality at which the operator is looking at that time.

The optical assembly can also automatically recognize the positioning of an object in a specific specialized group of objects, meaning that the operator can avoid having to compile a checklist of the contents of the group itself.

It is also possible in this way to assess the actual load associated with each specialized group, where the load refers to the number, type, positioning of the objects or similar information, which defines the workload that each item of equipment of the processing unit must carry out.

According to embodiments, the optical assembly is configured to perform computer vision algorithms based on Deep Learning techniques and/or neural networks. This makes it possible to ensure the advantageous improvement of the analysis of the acquired images and to identify any organic residues, stains, dirt or damage in the object more effectively, thus making the cleaning process more efficient and improving the efficiency of the objects or specialized groups of objects as well as their safety during use.

In addition, it makes the recognition of objects more certain, as these are often very similar to each other.

In accordance with the aforementioned aims, embodiments disclosed herein further refer to a method for managing the treatment cycle of objects to be sanitized, whereby parameters of the treatment cycle, in the case of sterilization of surgical instruments, are defined. The parameter-setting method may involve determining the parameters of the treatment cycle by means of information regarding the actual load associated with each container of specialized groups of objects, for example surgical kits, present in a processing basket, for example for washing, sterilization or similar treatments, and for sending said parameters to a unit for checking processing equipment, especially equipment for sanitization, and/or storage of objects, in particular surgical instruments in a sterilization unit. In this way, the efficiency of the cleaning process can be advantageously improved, automating the process of controlling the sanitization cycle and simplifying the work of the operator. It may thus be possible to increase the efficiency and safety of the recomposition of the specialized group of objects, to which the operator can devote more attention and concentration.

ILLUSTRATION OF THE DRAWINGS

These and other aspects, features and advantages of the present invention will become clear from the following embodiment disclosure, given by way of example only, not restricting, with reference to the attached drawings wherein.

To facilitate understanding, identical reference numbers have been used, where possible, to identify identical common elements in the figures. It should be noted that elements and features of an embodiment can be conveniently combined or incorporated into other embodiments without further clarification.

DESCRIPTION OF EMBODIMENTS

Detailed reference will now be made to the possible embodiments of the invention, one or more instances of which are shown in the attached figures by way of example only. The phraseology and terminology used herein is also exclusively for illustrative purposes.

Figure 1:
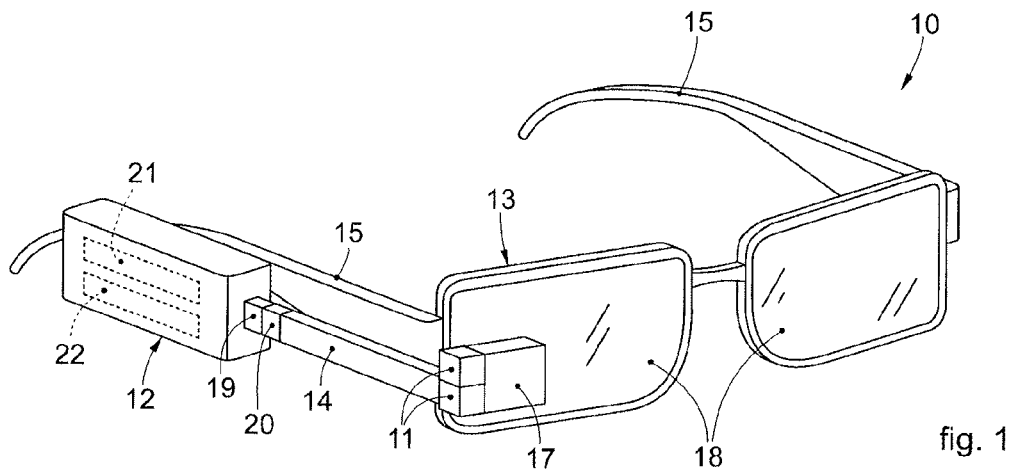
FIG. 1 is a three-dimensional schematic view of an optical assembly according to embodiments disclosed herein.
Figure 1A:
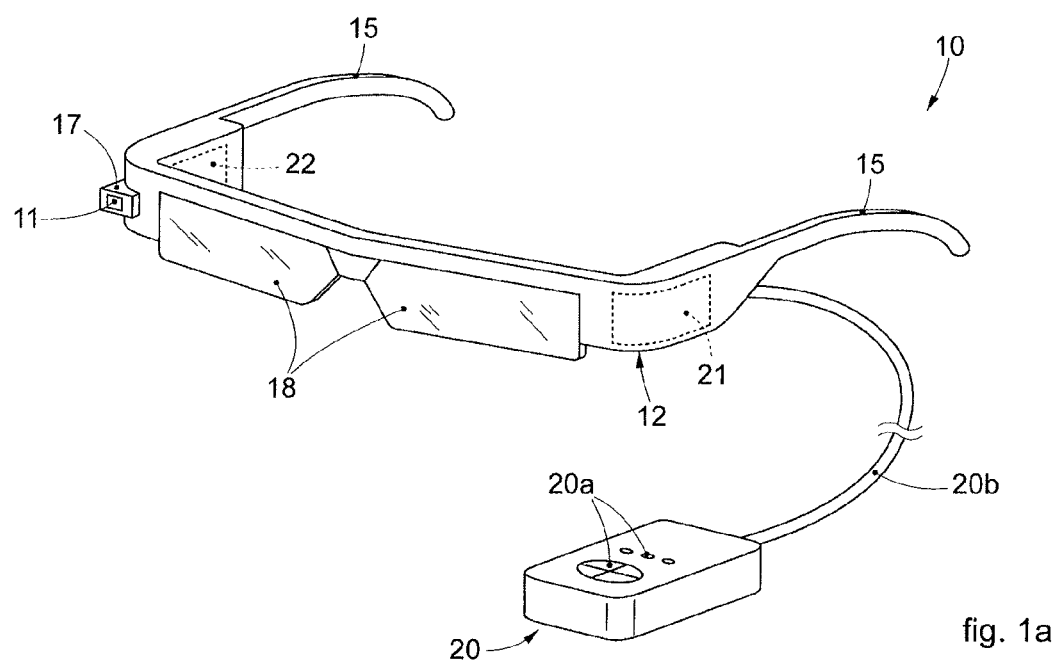
FIG. 1a is a three-dimensional schematic view of an optical assembly according to further embodiments disclosed herein.
Figure 2:
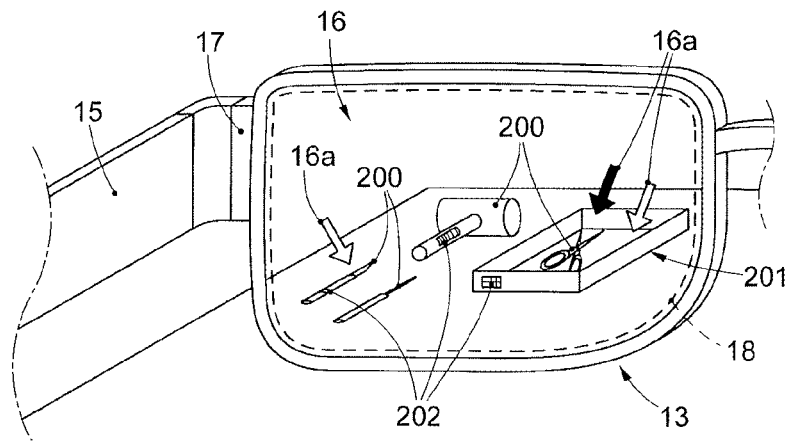
FIG. 2 is an illustrative view of the augmented reality achievable by means of the optical assembly of FIGS. 1 and 1a, when used in the context of a sterilization chamber.

With reference to FIGS. 1, 1a and 2, embodiments disclosed herein refer to a wearable augmented reality optical assembly 10 for use in a center for treating objects 200, in particular a surgical instrument sterilization unit 200.

Figure 3:
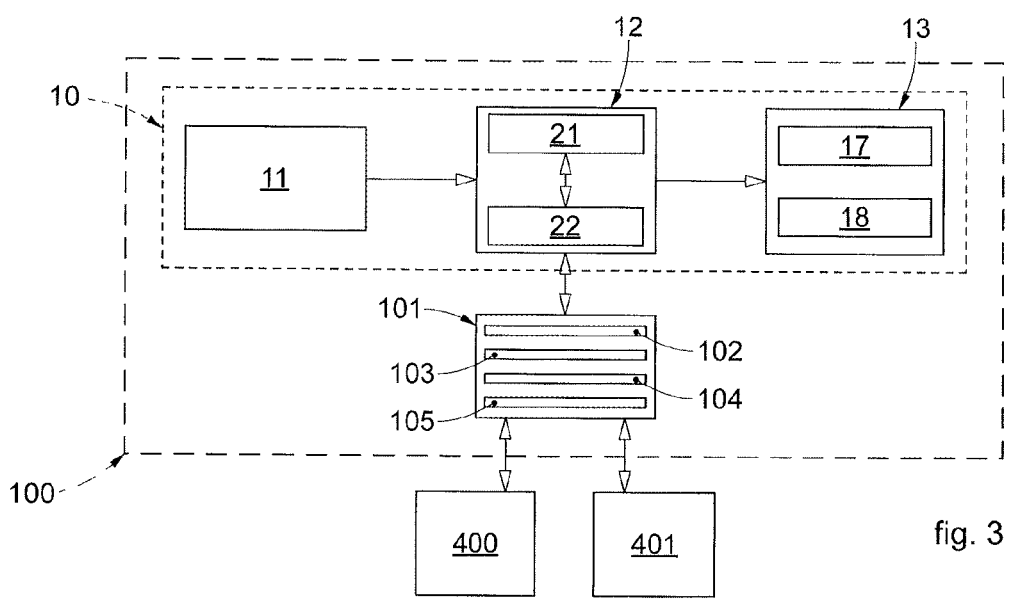
FIG. 3 is a schematic representation of an optical apparatus comprising the optical assembly of FIGS. 1 and 1a in use according to embodiments disclosed herein.
Figure 4:
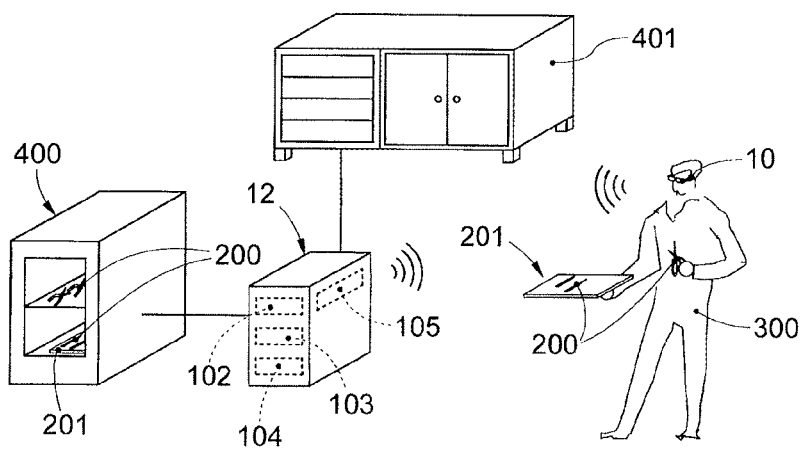
FIG. 4 is a three-dimensional schematic view of an optical assembly of FIG. 3 in use according to embodiments disclosed herein.

With reference to FIGS. 3 and 4, embodiments disclosed herein further relate to an optical apparatus 100 for use in a center for treating objects 200, in particular a surgical instrument sterilization unit 200, comprising an optical assembly 10, according to the invention, and a control unit 101.

The aforementioned objects 200 may be composed of specialized groups of objects 201; in particular, if the objects 200 are surgical instruments, the surgical instruments 200 may be made up into surgical instrument kits 201.

By way of example only, below is described a use case in a surgical instrument sterilization unit 200.

According to embodiments, the optical assembly 10 comprises:

electromagnetic acquisition means 11 configured to detect at least images and/or identification codes 202 of surgical instruments 200;

a processor 12 to perform image and data processing algorithms relating to said surgical instruments 200 and also adapted to generate visual content 16a from the images and the data;

a viewing device 13 capable of reproducing the visual content so as to make them available to an operator 300 of the sterilization unit.

The aforementioned images and data relating to said surgical instruments 200 may be images and information concerning the surgical instruments 200, the composition of the surgical kits 201, the washing and sterilization procedures, the organization and management of equipment 400, 401 of the sterilization unit and the like. For example, information may be related to the size of an instrument 200, the kit 201 in which the instrument 200 is to be placed, the position and arrangement within the kit 201 (e.g., a pair of scissors 200 may be in open or closed position), the identification code 202, the history of the sterilization procedures to which it has been subjected, indications relating to procedures to be performed or the like.

The data or part thereof may be made available to the operator 300 in the form of visual 16a or audio content. Said data can also be used by the optical assembly 10 and/or the optical apparatus 100 for processing and/or storing processed data.

The visual content 16a may be images, a sequence of images, a video, a text or a combination thereof, or the like, adapted to reproduce the data, or part thereof, relating to the surgical instruments 200.

According to embodiments, the optical assembly 10 further includes a communication module 14 for communication with a control unit 101 for transmitting and/or receiving said data.

For example, the viewing device 13 is configured as a pair of glasses, as depicted in FIGS. 1 and 1a, or as a visor, or in similar forms. In particular, the viewing device 13 can be configured as a smart glass of a known type.

The viewing device may comprise elements for attachment 15 to the operator's head 300, such as temples, elastic straps, a helmet or the like.

As depicted in FIG. 2, the viewing device 13 comprises a virtual screen 16 and reproduction means 17 capable of reproducing the visual content 16a relating to the surgical instruments 200 to make them visually available to the operator 300 via the screen 16. In particular, the aforementioned visual content 16a are visible only to an operator 300 wearing the optical assembly 10.

The viewing device 13 can further comprise a support medium 18, or optical combiner, on which to display the virtual screen 16. The optical combiner 18 can be a transparent element, for example composed of one or two lenses in transparent material, such as to allow viewing of the external reality and overlay of the visual content 16a to be displayed to the operator.

The reproduction means 17 may be projectors of a type known in the art, capable of reproducing the visual content 16a received by the processor 26 on the optical combiner 18.

In an embodiment variant, the optical combiner 18 and the reproduction means 17 are integrated into a single component, such as a holographic, liquid crystal, OLED (Organic LED), or similar display.

FIG. 2 schematically depicts an example of what is visible to the operator on the screen 16 of the viewing device 13. Visual content 16a may be overlaid onto the actual images of the surgical instruments 200 and surgical kit 201 container, for example arrow-shaped indications, relating to any surgical instruments 200 that have been placed wrongly, such as an incorrectly arranged pair of scissors, or the container or sector of the container in which a surgical instrument 200 is to be placed.

The present invention therefore makes it possible to locate visually, immediately and effectively, the surgical instruments 200 that make up the kit 201, the way in which they must be placed, and any defects they may contain, and/or similar indications. It can also display warnings relating to the state of the equipment 400, 401 of the sterilization unit, such as errors, end of cycle, unload wait signals and the like, on the screen 16.

The present invention can also automatically recognize the positioning of a surgical instrument 200 in a given surgical instrument 200 kit 201 container, meaning that the operator can avoid having to compile a checklist of the contents of the container itself.

The present invention can also allow the automatic selection of the treatment cycle by displaying identification codes 202, for example a QR code or the like, of the possible cycles.

The optical assembly 10 may further comprise acoustic devices 19, such as earphones, bone conduction headphones, and/or a loudspeaker, by which the optical assembly may interface with the operator 300 via acoustic signals such as tones, alarms or the like.

For example, by means of a loudspeaker 19 associated with the hooking elements 15 and configured to play sound content, the optical assembly 10 may provide the oral information of a vocal guide. The optical assembly 10 may then also provide multimedia content comprising sound content and visual content 16a.

According to embodiments, the processor 12 may comprise a processing device 21 and a storage device 22 on which a management and tracking program, or part thereof, may be installed or installable.

According to embodiments, the processor 12 is configured to perform computer vision algorithms.

Said computer vision algorithms can be based on Deep Learning techniques and/or neural networks.

According to an embodiment variant, the computer vision algorithms may be based on traditional matching techniques. By way of example only, bin picking techniques can be used.

The storage device 22 may also store data relating to the surgical instruments 200, as well as data relating to training sets and validation sets of computer vision algorithms based on Deep Learning techniques and/or neural networks.

The storage device 22 may be connected to the processing device 21 and be selected from those commercially available, such as Random Access Memory (RAM), read only memory (ROM) or any other form of digital storage.

The processing device 21 may be any form of computer processor that can be used to process data advantageously in the field of image and identification code 202 processing.

The processing device 21 may be adapted to process data relating to surgical instruments 200, such as those obtained by the acquisition means 11 and possibly those sent by an external control unit 101, by means of the aforementioned management and tracking program or part thereof.

In particular, the processing device 21 may be adapted to process the aforementioned data autonomously or to acquire the data processed by the external control unit 101 and further process or manage them for control of the reproduction means 17.

For this purpose, the processing device 21 may be adapted to execute the program for managing and tracking surgical instruments 200, or part thereof.

According to embodiments, the processing device 21 may include a training module and a module for using computer vision algorithms based on Deep Learning techniques and/or neural networks.

According to embodiments, the electromagnetic acquisition means 11 comprise one or more image acquisition devices, chosen from video cameras and thermal imaging cameras.

The electromagnetic acquisition means 11 may further comprise one or more electronic acquisition means such as radio frequency, or RFID (Radio-Frequency Identification) tags, NFC (Near Field Communication) tags, RTLS (Real Time Locating System) or the like.

The electromagnetic acquisition means 11 can then read any identification codes 202, such as alphanumeric type codes, for example a "talking" code consisting of a sequence of numbers and letters, linear or two-dimensional bars, RFID tags, NFC tags and/or the like.

According to embodiments, the communication module 14 can be a short-range (Bluetooth, Bluetooth BLE, Zigbee or the like) and/or medium-range (such as LPWAN or the like) and/or long-range (Wi-Fi, 3G, 4G SIM cards or the like) wireless type device.

The optical assembly 10 may further comprise interface devices 20 with the operator 300 as a means of controlling the optical assembly 10 itself.

The interface devices 20 can be of the acoustic type, such as a microphone, can possibly come equipped with voice recognition software, and the operator 300 can interface with the optical assembly via voice commands.

For example, by means of the microphone 20 the operator 300 can ask the processor to show the visual content 16*a* displayed on the screen 16, and request other types of visual content 16*a* or the like. In this way, it is possible and advantageous to ensure further improvement of user-friendliness and avoid contamination.

The interface devices 20 can also be manually operated devices, for example, and as depicted in FIG. 1*a*, a command comprising buttons 20*a*, switches, and/or the like, for input, in a known way, of commands by the operator 300. Said command may include a connection cable 20*b* or wireless elements for communication with the processor 12, the communication module 14 and/or the reproduction means 16.

According to embodiments, the control unit 101 included in the optical apparatus 100 can comprise one or more process units 102, or CPU, one or more computer data storage devices 103, possibly an electronic database 104, and auxiliary and input/output circuits 105. The control unit 101 may also be configured to interface, in a known way, with external databases.

The control unit 101 may be configured to cooperate at least with the processor 12 of the optical assembly 10 in storing and/or processing data relating to the surgical instruments 200.

According to an alternative embodiment, the control unit 101 may be configured to process data relating to the surgical instruments 200 in an autonomous manner and to send it to the processor 12 for further processing or management for controlling the reproduction means 17.

According to a further embodiment, the control unit 101 may be configured to control the optical assembly 10 so as to control said processor 12 in the data storage and/or processing phases.

To this end, the control unit 101 may be suitable for performing a program for managing and tracking surgical instruments 200, or part thereof. According to embodiments, the control unit 101 may be configured to perform computer vision algorithms.

The control unit 101 may be configured to interface the optical assembly 10 with equipment for treatment or sanitization 400 or storage 401 of surgical instruments 200 in the sterilization unit.

The process unit(s) 102 may be any form of computer processor that can be used to process data advantageously in the monitoring and control of a sterilization unit.

The one or more memory devices 103 may be connected to the process unit(s) 102 and be one or more of those commercially available, such as Random Access Memory (RAM), Read-Only Memory (ROM), floppy disk, hard disk, mass storage, or any other form of digital storage, local or remote.

The management and tracking program, or a part thereof, may be installed or be installable on the one or more memory devices 103 to control one or more process units 102. Data relating to surgical instruments 200 may also be stored on the one or more memory devices 103.

According to embodiments in which the control unit 101 is configured to perform computer vision algorithms based on Deep Learning techniques and/or neural networks, the training module and the module for using the aforementioned algorithms can be included in one or more process units 102. Data relating to training sets and validation sets of computer vision algorithms based on Deep Learning techniques and/or neural networks may also be stored on the one or more memory devices 103.

The electronic database 104 may be adapted to store data relating to surgical instruments 200, surgical kits 201 or the like for the purposes of processing the data collected by the optical assembly 10, quality control, statistical analysis, operator safety management 300 or the like.

The auxiliary and input/output circuits 105 can be adapted to interface with an operator 300, with the assembly 10, with external power supply systems, with external databases, with subsequent processing systems and/or the like.

The auxiliary and input/output circuits 105 may include communication elements with the assembly 10 and possibly with sanitizing equipment 400 and/or storage equipment 401 of the sterilization unit.

The communication elements can be wired type devices (Ethernet, SB or the like) and/or short range (Bluetooth, Bluetooth BLE, Zigbee or the like) and/or medium range (such as LPWAN or the like) and/or long range (Wi-Fi, 3G, 4G SIM cards or the like) wireless type devices.

The auxiliary and input/output circuits 105 may further comprise operator interface equipment, such as video terminals, keyboards, mice, printers and the like, by means of which to display data, enter commands and the like for the operation of the sterilization unit.

According to embodiments, the auxiliary and input/output circuits 105 may provide a graphical interface, comprising in particular a graphical processing unit, a GPU memory, a graphical training module and a graphical usage module for interfacing in the use of computer vision algorithms based on Deep Learning techniques and/or neural networks.

Embodiments disclosed herein relate to a program for managing and tracking surgical instruments 200 comprising algorithms for processing images and data relating to surgical instruments 200 and for generating visual content 16*a* from the images and data.

The program for managing and tracking surgical instruments 200 may further comprise algorithms for determining wash cycle parameters by means of information relating to the actual loading of surgical kit containers 201 and sending said parameters to the control unit 101 to check the equipment to be used for sanitizing 400 or storing 401 surgical instruments 200 in a sterilization unit.

The aforementioned program may include instructions that determine the execution of a method for using an optical assembly 10 and that can be adapted, once implemented, for surgical instrument 200 recognition operations and in order to provide useful indications for the recomposition of surgical kits 201.

The aforementioned useful indications may be information about the instruments 200 that make up a kit 201, their position, the order of their layout in the kit 201, and similar information. For example, the program can verify that the surgical instruments 200 are positioned correctly in the kit 201 container, for example by locating a pair of open scissors, and that they are correctly spaced for subsequent automatic washing and sterilization operations.

The aforementioned program may further include instructions for the conformity assessment of the surgical instrument 200.

Conformity here means a condition in which the surgical instrument 200 is free of any organic residues, stains, dirt or the like and the surgical instrument 200 is not damaged. The conformity assessment can be carried out by comparing the image detected by the acquisition means 11 with respect to stored images.

The aforementioned program may also include instructions for the final verification of the surgical kits 201 and/or the correct packaging and/or loading into the sterilization baskets.

The program can also compile checklists related to the composition of surgical kits, lists that are currently compiled manually.

The program may include instructions for processing an image acquired by the electromagnetic acquisition means 11 of the optical assembly 10, by means of a comparison with images stored for recognition of surgical instruments 200, and possibly for evaluation of their conformity.

The program may include instructions for processing the above-mentioned image to perform a phase of recognition of an optical identification code 202 uniquely associated with a surgical instrument. Recognition can be effected by means of techniques, e.g., text, such as OCR (Optical Character Recognition) or the like.

According to embodiments, the program for managing and tracking surgical instruments 200 comprises computer vision algorithms based on Deep Learning techniques and/or neural networks.

According to one embodiment variant, the program for managing and tracking surgical instruments 200 includes computer vision algorithms based on traditional matching techniques.

The aforementioned computer vision algorithms can be adapted to perform one or more of the operations described above, including recognition, conformity assessment, provision of useful indications for the recomposition of surgical kits 201, and final verification.

Computer vision algorithms can be adapted to handle both two-dimensional (2D) and three-dimensional (3D) images.

Embodiments disclosed herein also relate to a method of using an optical assembly 10 according to the invention, for use in a center for treating objects, in particular a surgical instrument 200 sterilization unit.

The method involves:
detecting at least images and/or identification codes 202 of surgical instruments 200;
processing images and data relating to the surgical instruments 200 and generating visual content 16a from said images and data;
reproducing the visual content 16a to make them visually available to an operator 300 of the sterilization unit.

The method may also include a control phase to verify whether preparation of the surgical kit 201 has been performed correctly. In one embodiment, the outcome of this verification is positive if images and/or identification codes 202 detected by the acquisition means coincide with the corresponding images/codes stored in the processor 12 and/or in the control unit 101, while it is negative if such images/codes do not coincide.

The method may also include training an algorithm to recognize when packaging and loading into the sterilization baskets have been performed correctly.

The method can provide for the training of a vision algorithm by having the optical assembly 10 acquire, in an initial phase, a set of images of a compliant and non-compliant surgical instrument 200, such as images in which the surgical instrument 200 is damaged or dirty, with associated characterizations or judgments regarding their condition provided by the operator for the training and validation phases.

The method may provide for the acquisition of sets of images of the same surgical instrument 200 at different locations so as to obtain its geometry as well as provide for use of the vision algorithm so trained.

Training could also be updated during use of the algorithm, for example by inserting new characterizations in conjunction with the acquisition of images of new surgical instruments 200.

Embodiments disclosed herein also refer to a method for managing the treatment cycle of objects to be sanitized, for the purpose of defining cycle parameters, in particular sterilization of surgical instruments 200.

The parameter-setting method can provide for determination of the parameters of the sterilization cycle by means of information relating to the actual loading of surgical kit containers 201 and for the sending of said parameters to the control unit 101 to check the equipment to be used for sanitizing 400 or storing 401 surgical instruments 200 in a sterilization unit.

The above parameters may be the duration of the sterilization cycle phases, a temperature, for example of the washing water or the sterilization steam, the concentrations of substances for washing and/or disinfection or the like.

The parameter-setting method may further include determining error parameters indicative of one or more surgical instruments 200 positioned in a non-compliant manner.

According to embodiments, information relating to the actual loading of surgical kit 201 containers may be provided by an optical assembly 10 according to the invention.

According to an embodiment variant, information relating to the actual loading of surgical kit containers 201 can be provided by a fixed assembly, not disclosed in the attached Figures. For example, the fixed assembly may be an optical assembly including one or more video cameras.

According to a further embodiment variant, the fixed assembly may be non-optical and/or comprise one or more data collection tools, not based on optical principles. For example, one or more data collection tools may be one or more RFID, NFC, RTLS tag readers or the like.

The fixed assembly may further comprise a processor for executing a program for managing and tracking surgical instruments 200.

According to embodiments, the fixed assembly can be positioned at a workbench, a pick-up point of the surgical instruments 200 or the like. The fixed assembly can preferably be placed at the input of sanitizing equipment 400 or storage equipment 401 or the like.

It is clear that modifications and/or additions of parts or steps can be made, without departing from the scope of the present invention as defined by the claims, to the optical assembly 10, the optical apparatus 100, the management and tracking program, the method for managing surgical instruments 200 and the parameter setting method disclosed above.

In the following claims, the references in parentheses have the sole purpose of facilitating reading and must not be considered as limiting factors as regards the scope of protection underlying the specific claims.

The invention claimed is:

1. A wearable augmented reality optical assembly for use in a center for washing and sterilization of objects for the recognition, by means of computer vision techniques, of said objects, comprising electromagnetic acquisition means configured to detect at least images and/or identification codes of objects, a processor configured to perform image and data processing algorithms and also to generate visual content and a viewing device capable of reproducing said visual content to make them visually available to an operator, wherein said processor comprises a program for managing and tracking objects adapted to recognize said object and provide the operator with indications for the recomposition of kits or specialized groups of objects, that is surgical kits, wherein said images and data relating to said objects are images and information concerning the objects, the composition of the surgical kits, the washing and sterilization procedures, the organization and management of equipment of the sterilization center, including one or more of: the size of an object, the surgical kit in which an object is to be placed, the position and arrangement within the surgical kit, said identification code, the history of the sterilization procedures to which it has been subjected, and indications relating to procedures to be performed, wherein said program is configured to compile checklists related to the composition of surgical kits.

2. The optical assembly as in claim 1, wherein said processor is configured to perform computer vision algorithms based on Deep Learning techniques and/or neural networks.

3. The optical assembly as in claim 1, wherein said viewing device comprises a virtual screen and reproduction means capable of reproducing said visual content.

4. The optical assembly as in claim 1, wherein it is provided with a communication module configured to transmit/receive said data to an external control unit.

5. The optical assembly as in claim 1, wherein said electromagnetic acquisition means comprise one or more devices, chosen from video cameras and thermal imaging cameras.

6. The optical assembly as in claim 5, wherein said electromagnetic acquisition means further comprise one or more electronic acquisition means, chosen from RFID tag and NCF tag readers.

7. The optical apparatus for use in a center for treating objects, wherein it comprises an optical assembly as in claim 1 and a control unit configured at least to cooperate with a processor in steps of storing and/or processing data relating to said objects and/or to interface the optical assembly with said equipment for treating and storing objects in said center, wherein said control unit comprises a program for managing and tracking objects suitable for the recognition of the object.

8. A management and tracking program as in claim 7, wherein it comprises instructions for processing an image, acquired by electromagnetic acquisition means, of said optical assembly, to recognize the objects.

9. The management and tracking program as in claim 8, wherein it comprises instructions for processing an image, acquired by electromagnetic acquisition means, of said optical assembly to perform a step of recognition of an identification code uniquely associated with an object.

10. Management and tracking program as in claim 8, wherein it includes computer vision algorithms based on Deep Learning techniques and/or neural networks.

11. The management and tracking program as in claim 8, further comprising instructions for processing the image, acquired by the electromagnetic acquisition means, of said optical assembly, to recognize the objects conformity by means of a comparison with stored images.

12. The optical apparatus of claim 7, wherein the program is further configured to manage and track objects suitable for the recognition and conformity of the object to provide useful indications for the recomposition of surgical kits.

13. The optical apparatus of claim 12, wherein the program is further configured for managing and tracking objects suitable for the recognition of the object and its conformity to provide final verification of surgical kits.

14. A program for managing and tracking objects comprising instructions that determine the execution of a method for managing objects by means of an optical assembly as in claim 1, said program instructions being adapted, once executed, to allow recognition of the object and to provide indications for the recomposition of surgical kits.

15. A method for handling objects in a center for treating objects adapted to allow the processing of said objects by means of an optical assembly as in claim 1, wherein the method provides for the steps of:

detecting at least images and/or identification codes of objects;

processing images and data relating to said objects and generating visual content relating to said objects from said images and data;

reproducing said visual content to make it visually available to an operator of the treatment center.

16. The method for managing a treatment cycle of objects to be sanitized, by means of which parameters of said treatment cycle are defined, wherein said method comprises the determination of parameters of the treatment cycle by means of information obtained through the method as in claim 15.

* * * * *